US011708632B2

(12) United States Patent
Heng

(10) Patent No.: US 11,708,632 B2
(45) Date of Patent: *Jul. 25, 2023

(54) THREE DIMENSIONAL PRINTED HARDFACING ON A DOWNHOLE TOOL

(71) Applicant: Halliburton Energy Services, Inc., Houston, TX (US)

(72) Inventor: Sotha Heng, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 641 days.

This patent is subject to a terminal disclaimer.

(21) Appl. No.: 16/645,179

(22) PCT Filed: Oct. 17, 2017

(86) PCT No.: PCT/US2017/056947
§ 371 (c)(1),
(2) Date: Mar. 6, 2020

(87) PCT Pub. No.: WO2019/078822
PCT Pub. Date: Apr. 25, 2019

(65) Prior Publication Data
US 2022/0111440 A1    Apr. 14, 2022

(51) Int. Cl.
*C23C 6/00* (2006.01)
*B22F 12/50* (2021.01)
(Continued)

(52) U.S. Cl.
CPC ............... *C23C 6/00* (2013.01); *B22F 10/22* (2021.01); *B22F 12/50* (2021.01); *B23K 5/18* (2013.01); *B23K 9/044* (2013.01); *E21B 12/00* (2013.01); *B22F 2005/001* (2013.01); *E21B 10/46* (2013.01)

(58) Field of Classification Search
CPC ....... E21B 10/46; E21B 17/1085; C23C 6/00; C23C 4/20; C23C 4/123; C23C 4/134; B05C 11/10; B22F 12/50; B22F 10/22; B22F 3/20; B22F 2003/208; B22F 2005/001; B22F 2203/11; B23K 5/18; B23K 9/044; B24D 18/0063
See application file for complete search history.

(56) References Cited

U.S. PATENT DOCUMENTS

| 4,277,108 A | * | 7/1981 | Wallace | B23K 9/046 |
| | | | | 175/325.1 |
| 10,267,101 B2 | * | 4/2019 | Miller | E21B 17/1085 |

(Continued)

FOREIGN PATENT DOCUMENTS

| WO | 2012/012754 | 1/2012 |
| WO | 2019/078824 | 4/2019 |

OTHER PUBLICATIONS

International Search Report received for PCT Patent Application No. PCT/US2017/056947, dated Jul. 10, 2018; 16 pages.

(Continued)

*Primary Examiner* — Yong-Suk (Philip) Ro
(74) *Attorney, Agent, or Firm* — Michael Jenney; C. Tumey Law Group PLLC

(57) ABSTRACT

The present disclosure provides downhole tools, methods for three dimensional printing hardfacing on such downhole tools, and systems for implementing such methods.

20 Claims, 8 Drawing Sheets

(51) Int. Cl.
*B22F 10/22* (2021.01)
*E21B 12/00* (2006.01)
*B23K 5/18* (2006.01)
*B23K 9/04* (2006.01)
B22F 5/00 (2006.01)
E21B 10/46 (2006.01)

(56) References Cited

U.S. PATENT DOCUMENTS

| | | | |
|---|---|---|---|
| 11,162,304 B2* | 11/2021 | Heng | B33Y 10/00 |
| 2008/0202817 A1* | 8/2008 | Massey | E21B 10/08 |
| | | | 76/108.4 |
| 2010/0000798 A1* | 1/2010 | Patel | B23K 31/025 |
| | | | 175/425 |
| 2011/0042145 A1 | 2/2011 | Xia et al. | |
| 2011/0073233 A1* | 3/2011 | Eason | B23K 31/02 |
| | | | 156/60 |
| 2011/0114394 A1 | 5/2011 | Lockwood et al. | |
| 2013/0092453 A1* | 4/2013 | Johnson | E21B 10/54 |
| | | | 175/428 |
| 2014/0054027 A1 | 2/2014 | Bird | |
| 2014/0246249 A1* | 9/2014 | Cheng | B23P 15/28 |
| | | | 175/426 |
| 2017/0081944 A1 | 3/2017 | Wang et al. | |

OTHER PUBLICATIONS

International Search Report received for PCT Patent Application No. PCT/US2017/056961, dated Jul. 2, 2018; 15 pages.

* cited by examiner

CARBIDE DISSOLUTION AND SETTLING TO BOTTOM OF HARDFACING

DAMAGED CARBIDES OF HARDFACING SHOWN AS HALO

THREE DIMENSIONAL PRINTED HARDFACING ON A DOWNHOLE TOOL

PRIORITY CLAIM

The present application is a U.S. National Stage Application of International Application No. PCT/US2017/056947 filed Oct. 17, 2017, which designates the United States.

TECHNICAL FIELD

The present disclosure relates generally to hardfacing on downhole tools.

BACKGROUND

Various types of downhole tools are used to form wellbores in downhole formations. It is common practice to form a downhole tool with a particular configuration and to subsequently treat part of the downhole tool to provide abrasion, erosion and/or wear resistance. One type of treatment includes applying a layer of hard abrasion, erosion and/or wear resistant material, often referred to as hardfacing, to a surface of the downhole tool. Hardfacing is frequently applied to a downhole tool using conventional welding techniques to extend the service life of the tool.

BRIEF DESCRIPTION OF THE DRAWINGS

For a more complete understanding of the present disclosure and its features and advantages thereof, reference is now made to the following description, taken in conjunction with the accompanying drawings and detailed description, wherein like reference numerals represent like parts, in which.

DETAILED DESCRIPTION

The present disclosure relates to a hardfacing system and methods of applying hardfacing to a downhole tool using the hardfacing system, including a hardfacing system for 3D printing hardfacing and methods of 3D printing hardfacing. The system and method may allow controlled, automated hardfacing of a downhole tool. The system and method may also decrease or avoid thermal damage of the hardfacing.

The disclosed systems and methods and their advantages may be best understood by referring to FIGS. 1-7 of the drawings, in which like numerals refer to like parts.

Figure 1:
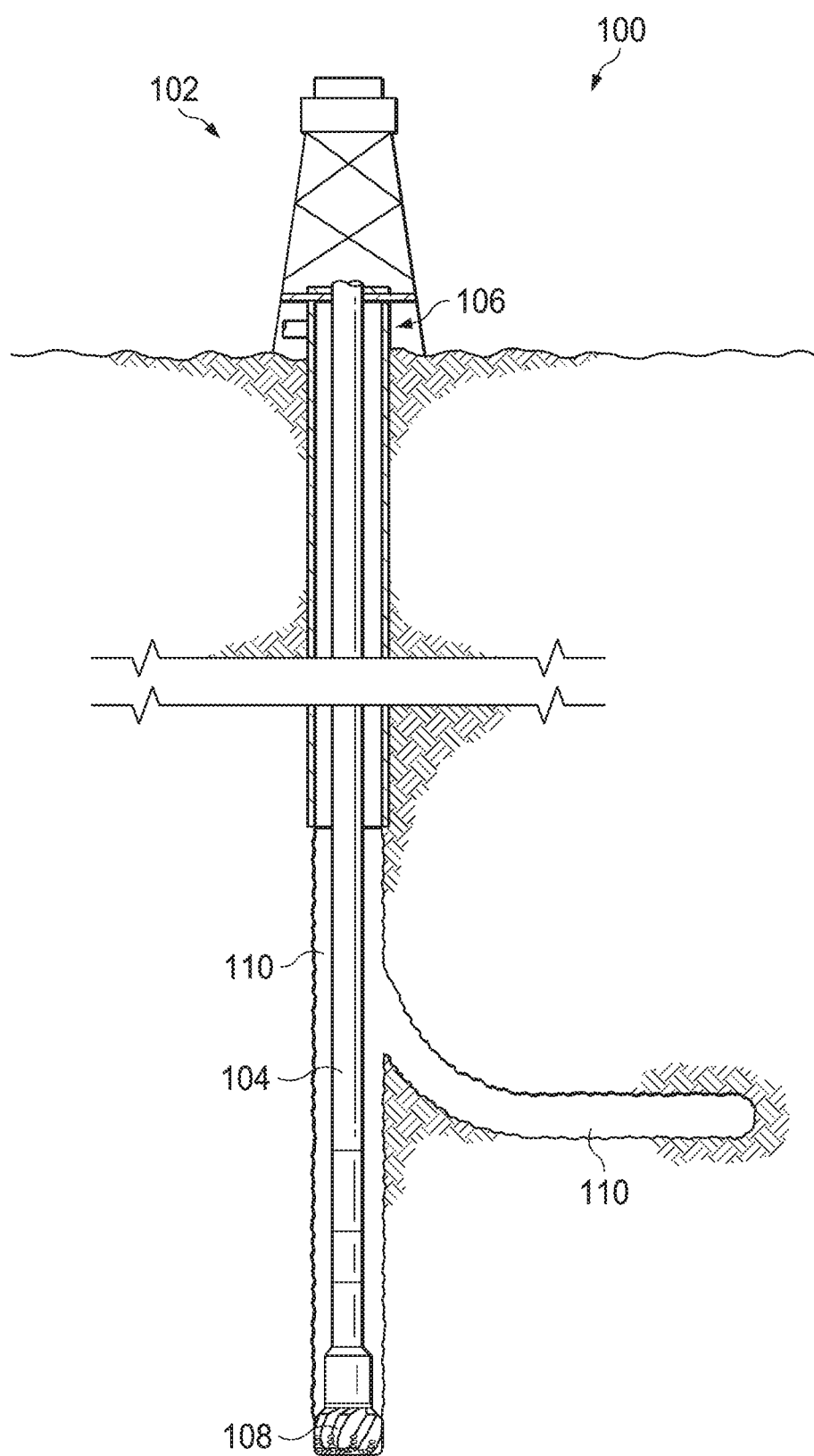
FIG. 1 is an elevation view of selected elements of a drilling system in which a downhole tool with hardfacing on at least one surface may be used.

Turning now to the drawings, FIG. 1 is an elevation view of a drilling system in which a downhole tool containing hardfacing on surfaces of the downhole tool may be used. Drilling system 100 includes a well surface or well site 106. Various types of drilling equipment such as a rotary table, drilling fluid pumps and drilling fluid tanks (not expressly shown) may be located at well surface or well site 106. For example, well site 106 may include drilling rig 102 that may have various characteristics and features associated with a land drilling rig. However, downhole tools incorporating teachings of the present disclosure may be satisfactorily used with drilling equipment located on offshore platforms, drill ships, semi-submersibles, and/or drilling barges (not expressly shown).

When configured for use with a rotary drill bit, drilling system 100 includes drill string 104 associated with drill bit 108, typically through a bottom hole assembly (BHA). The drilling system may be used to form a wide variety of wellbores or bore holes such as generally vertical wellbore 110 or a directional wellbore, such as generally horizontal wellbore 110, or any combination thereof. Drilling system 100 may be configured in alternative ways for other downhole tools.

In the present disclosure, drill bit 108 or another downhole tool in drilling system 100 includes hardfacing on the bit. The hardfacing may have been applied on one or more surfaces of the downhole tool by a hardfacing system using three dimensional (3D) printing hardfacing. The hardfacing may optimize drill bit 108 or another downhole tool for the conditions experienced during the drilling operation to increase the life span of drill bit 108 or another downhole tool. Although drill bit 108 is depicted as a fixed-cutter drill bit, any drill bit, such as a rotary drill bit, having a bit head with hardfacing on one or more surfaces of the drill bit, such as a rotary drill bit, may be used in drilling system 100. Other components of drilling system 102, such as reamers, core bits, under reamers, near bit reamers, hole openers, stabilizers, centralizers, and shock absorber assemblies may have hardfacing on at least surface in addition to or as an alternative to hardfacing on drill bit 108.

Hardfacing may be on at least one surface of a downhole tool used to form a wellbore, particularly if such surface may benefit from protection from abrasion, erosion and/or wear. Such surface of the downhole tool may be formed from various metal alloys and/or cermets having particular metallurgical characteristics such as machinability, toughness, and heat treatability and/or corrosion resistance. For example, a surface may be formed from various steel alloys used in downhole tools.

Figure 2A:
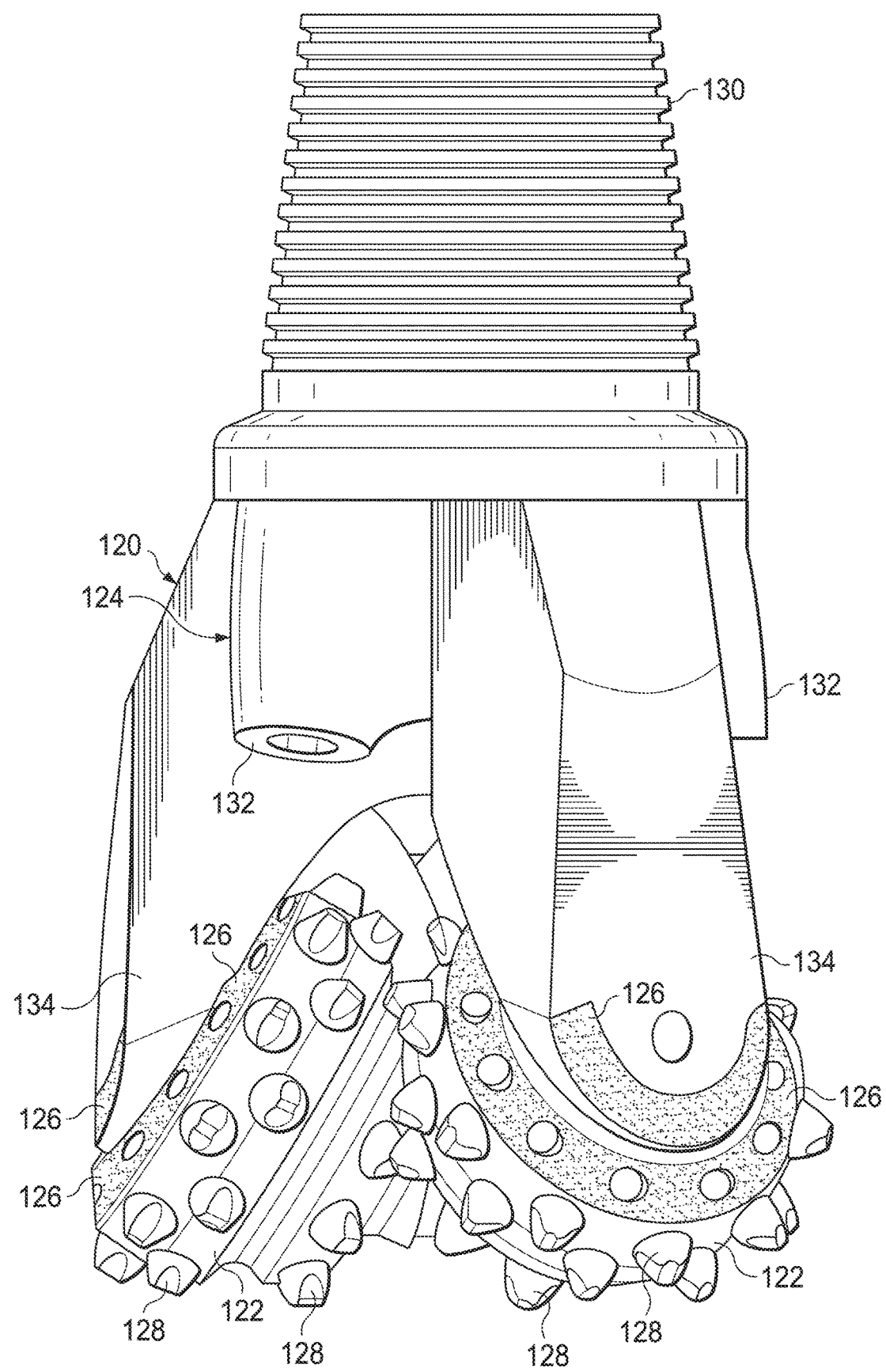
FIG. 2A is a schematic drawing in elevation showing selected elements of a rotary cone drill bit with hardfacing.
Figure 2B:
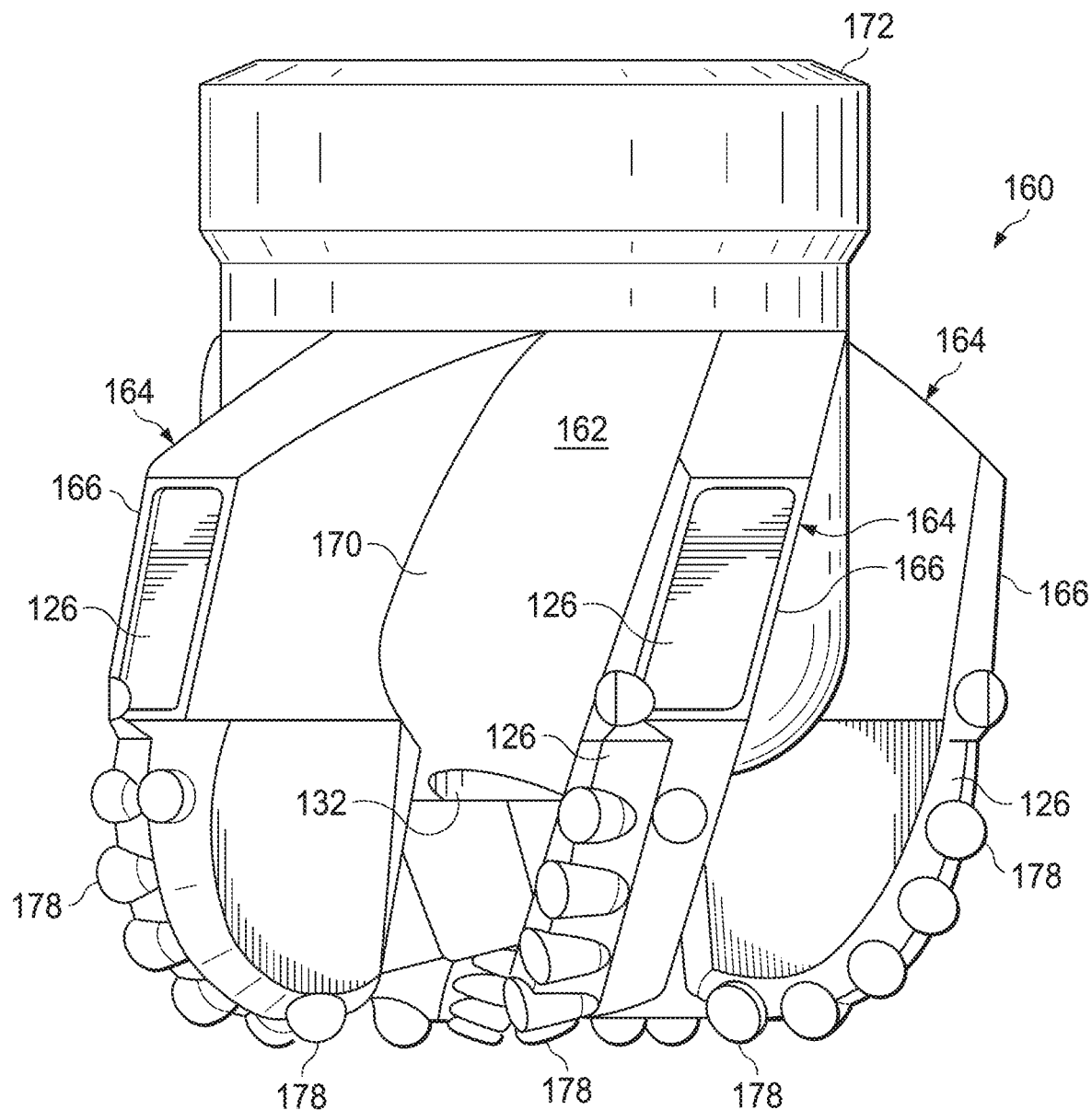
FIG. 2B is a schematic drawing in elevation showing selected elements of a fixed cutter drill bit with hardfacing.

FIGS. 2A and 2B are elevation views showing selected elements of a rotary cone drill bit 120 and a fixed cutter drill bit 160, respectively with hardfacing 126. Rotary cone drill bit 120 or fixed cutter drill bit 160 may be used as rotary drill bit 108 of FIG. 1.

Figure 3:
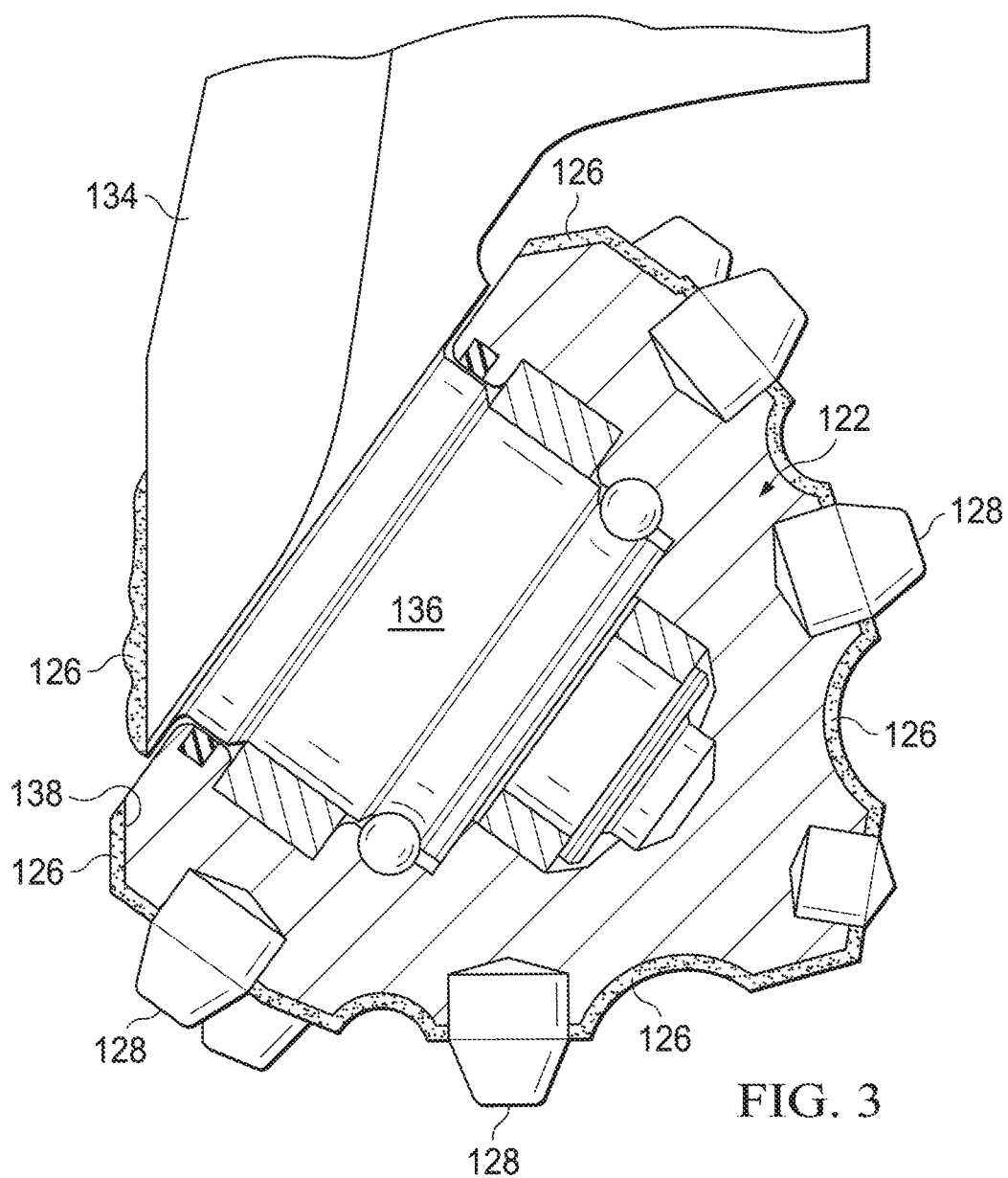
FIG. 3 is a drawing partially in section and partially in elevation with portions broken away showing selected elements of a roller cone assembly and a support arm of the drill bit of FIG. 2A with hardfacing.
Figure 5:
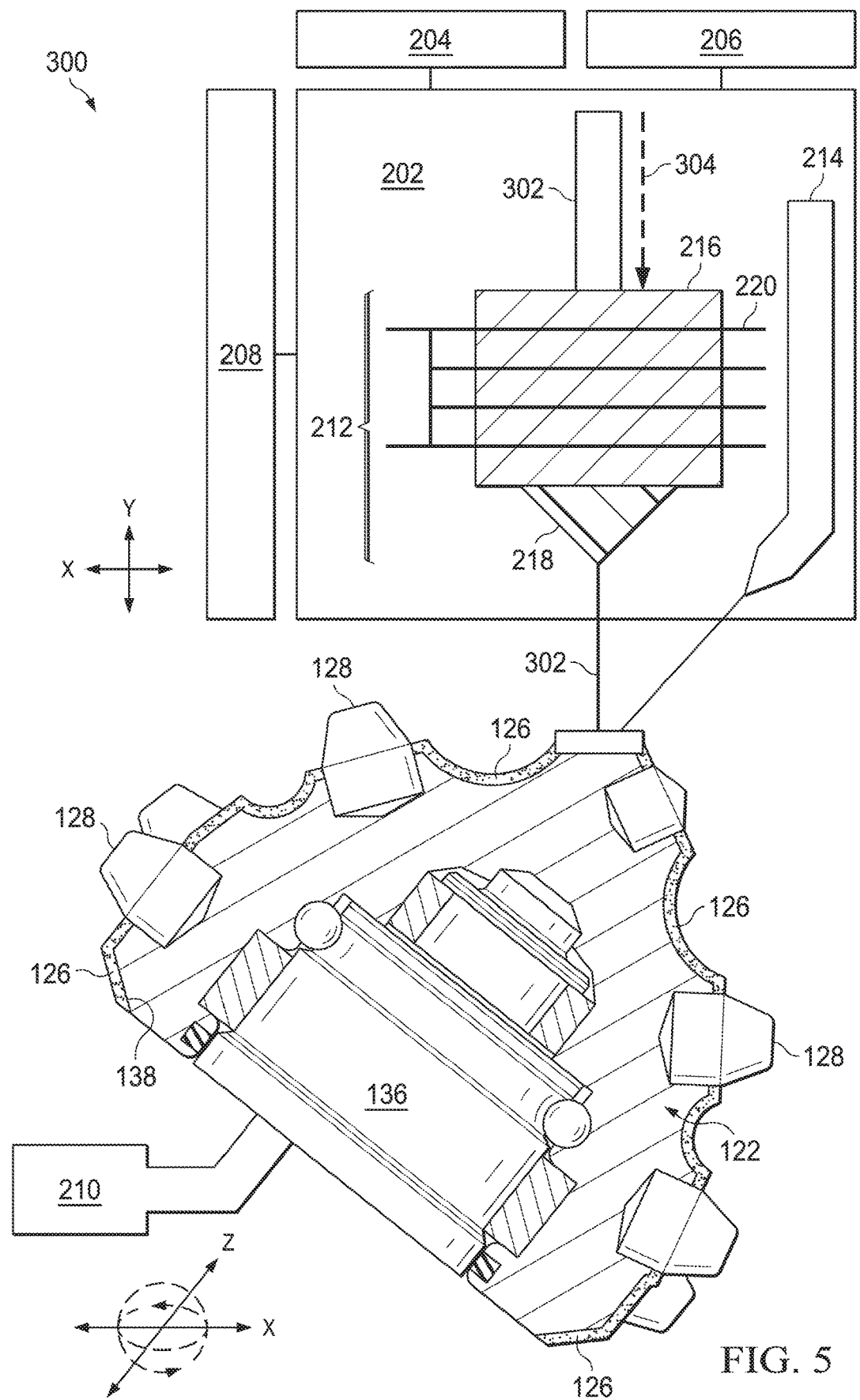
FIG. 5 is a block diagram of the hardfacing system of FIG. 4 as used in three dimensional printing hardfacing on the roller cone assembly of FIG. 3.

Hardfacing 126 disposed on rotary cone drill bit 120 is shown in FIGS. 2A, 3 and 5 and hardfacing 126 disposed on fixed cutter drill bit 160 is shown in FIG. 2B. In FIGS. 2A, 2B, 3 and 5, hardfacing 126 is illustrated as disposed on multiple surfaces. Hardfacing 126 may include at least one hard material particle and at least one matrix material.

Hard material particles in hardfacing 126 may be in the form of powders, pellets, or other small discrete objects. Hardfacing 126 may be in a wide range of mesh sizes, such as between 12 U.S. mesh and 400 U.S. mesh. The ability to use a wide range of mesh sizes may substantially reduce costs of 3D printing hardfacing 126 on downhole tools. It may also reduce costs associated with the hardfacing system components.

The matrix material component of hardfacing 126 has a melting temperature below the melting temperature or melting temperatures of the particles and and/or below the temperature at which the particle or particles begin to experience thermal damage or degradation. The matrix material component is melted by hardfacing systems as described herein during methods of applying hardfacing as described herein.

Hardfacing 126, particularly the matrix material component of hardfacing 126, may include any of a variety of hard materials such as, but not limited to, at least one material selected from the group consisting of a metal, a metal alloy, a ceramic alloy, a cermet, and any combinations and/or sub-combinations thereof. Hardfacing 126, particularly the matrix material component of hardfacing 126, may include any of a variety of hard materials such as, but not limited to, at least one material selected from the group consisting of an iron alloy, an iron, manganese, and silicon alloy, copper, a copper alloy, nickel, a nickel alloy, cobalt, a cobalt alloy, and any combinations and/or sub-combinations thereof.

Hardfacing 126, particularly the hard material particles of hardfacing 126, may include a metal boride, metal carbide, a metal nitride, a metal silicide and any combinations and/or sub-combinations thereof. Hardfacing 126, particularly the hard material particles of hardfacing 126, may include at least one material selected from the group consisting of tungsten, tungsten boride tungsten carbide, tungsten nitride, tungsten oxide, tungsten silicide, copper, copper boride, copper carbide, copper oxide, copper nitride, copper silicide, niobium, niobium boride niobium carbide, niobium nitride, niobium oxide, niobium silicide, vanadium, vanadium boride vanadium carbide, vanadium nitride, vanadium oxide, vanadium silicide, molybdenum, molybdenum boride molybdenum carbide, molybdenum oxide, molybdenum nitride, molybdenum silicide, titanium, titanium boride titanium carbide, titanium oxide, titanium nitride, titanium silicide, tantalum, tantalum boride tantalum carbide, tantalum oxide, tantalum nitride, tantalum silicide, zirconium, zirconium boride, zirconium carbide, zirconium oxide, zirconium nitride, zirconium silicide, chromium, chromium boride chromium carbide, chromium oxide, chromium nitride, chromium silicide, yttrium, yttrium boride yttrium carbide, yttrium oxide, yttrium nitride, yttrium silicide, boron, boron carbide, boron oxide, boron nitride, boron silicide, silicon, silicon boride, silicon carbide, silicon oxide, silicon nitride, and any combinations and/or sub-combinations thereof.

The bit body of roller cone drill bit 120 may be manufactured from a metal, such as a steel alloy, particularly a strong, ductile steel alloy having high strength and toughness, and reasonable machinability. Such steel alloys generally do not provide good, long term cutting surfaces and cutting faces because such steel alloys are often rapidly worn away during direct contact with adjacent portions of a downhole formation. To increase downhole service life of roller cone drill bit 120, hardfacing 126 may be applied on at least one of a shirttail surface, a backface surface, a milled tooth, an insert and/or another surface that may frequently contact the formation or debris. Hardfacing 126 may also be applied on any other portions of drill bit 120 which may be subjected to intense erosion, wear and/or abrasion during drilling. For some downhole tools, at least 50%, at least 80%, or at least 95% of the total exterior surface area of roller cone 122 may be covered with hardfacing 126.

Arms 134 may extend from bit body 124 opposite from threaded connection 130. Two substantially identical arms 134 are shown in FIG. 2A. Other numbers of arms may be present. The lower end portion of each arm 134 may be provided with a bearing pin or spindle to rotatably support generally conical roller cone assembly 122. FIG. 3 shows roller cone assembly 122, which has been rotatably mounted on spindle 136 extending from the lower portion of each support arm 134.

Drill bit 120 includes bit body 124 connectable by pin or threaded connection 130 to the lower end of a drill string (not expressly shown). Bit body 124 may include a passage (not shown) that provides downward communication for drilling mud or other fluids passing downwardly through an associated drill string.

Drilling mud or other fluids may exit through one or more nozzles 132 and be directed to the bottom of an associated wellbore. They then may pass upwardly in an annulus formed between the wall of the wellbore and the outside diameter of the drill string. The drilling mud or other fluids may be used to remove formation cuttings and other downhole debris from the bottom of the wellbore. The flow of drilling mud, formation cuttings and other downhole debris may erode various surfaces and substrates on bit body 124, support arms 134 and/or cone assemblies 122. Such surfaces may be protected by hardfacing 126.

As shown in FIGS. 2A and 3, hardfacing 126 may be on exterior surfaces of support arms 134 adjacent to the respective roller cone assemblies 122. This portion of each support arm 134 may also be referred to as the shirttail surface. Hardfacing 126 may also be on backface surface or gauge ring surface 138 of each roller cone assembly 122. As shown in FIG. 3, the exterior surface area of roller cone assembly 122 may be completely covered with hardfacing 126 except for inserts 128.

As shown in FIG. 2B, the bit body of fixed cutter drill bit 160 may be manufactured from a metal, such as a steel alloy, particularly a strong, ductile steel alloy having high strength and toughness, and reasonable machinability. To increase downhole service life of fixed cutter drill bit 160, hardfacing 126 may be applied on various portions of blades 164 and/or exterior portions of bit body 162. Hardfacing 126 may also be applied in junk slots 170 formed between adjacent blades 164, and at least one of a shirttail surface, a backface surface, a milled tooth, an insert and/or another surface that may frequently contact the formation or debris. Hardfacing 126 may also be applied on any other portions of drill bit 160 which may be subjected to intense erosion, wear and/or abrasion during drilling.

Drill bit 160 includes bit body 162 connectable by pin or threaded connection to the lower end of a drill string (not expressly shown) at proximate end 172 of bit body 162. Bit body 162 may include a passage (not shown) that provides downward communication for drilling mud or other fluids passing downwardly through an associated drill string. One or more nozzles 132 may be provided in bit body 162 to direct the flow of drilling mud or other fluids therefrom. Hardfacing 126 may be applied on or near nozzles 132.

Cutting elements 178 disposed on associated blades 164 may contact adjacent portions of a downhole formation (not expressly shown). The inside diameter of an associated wellbore may be generally defined by a combined outside diameter or gage diameter determined at least in part by respective gage portions 166 of blades 164. Cutting elements 178 may include a respective cutting surface or cutting face oriented to engage adjacent portions of a downhole formation during rotation of fixed cutter drill bit 160. Hardfacing 126 may be applied on exterior portions of blades 164 and/or exterior portions of bit body 162. For example, respective hardfacing 126 may be disposed on gage portion 166 of each blade 164.

Figure 4:
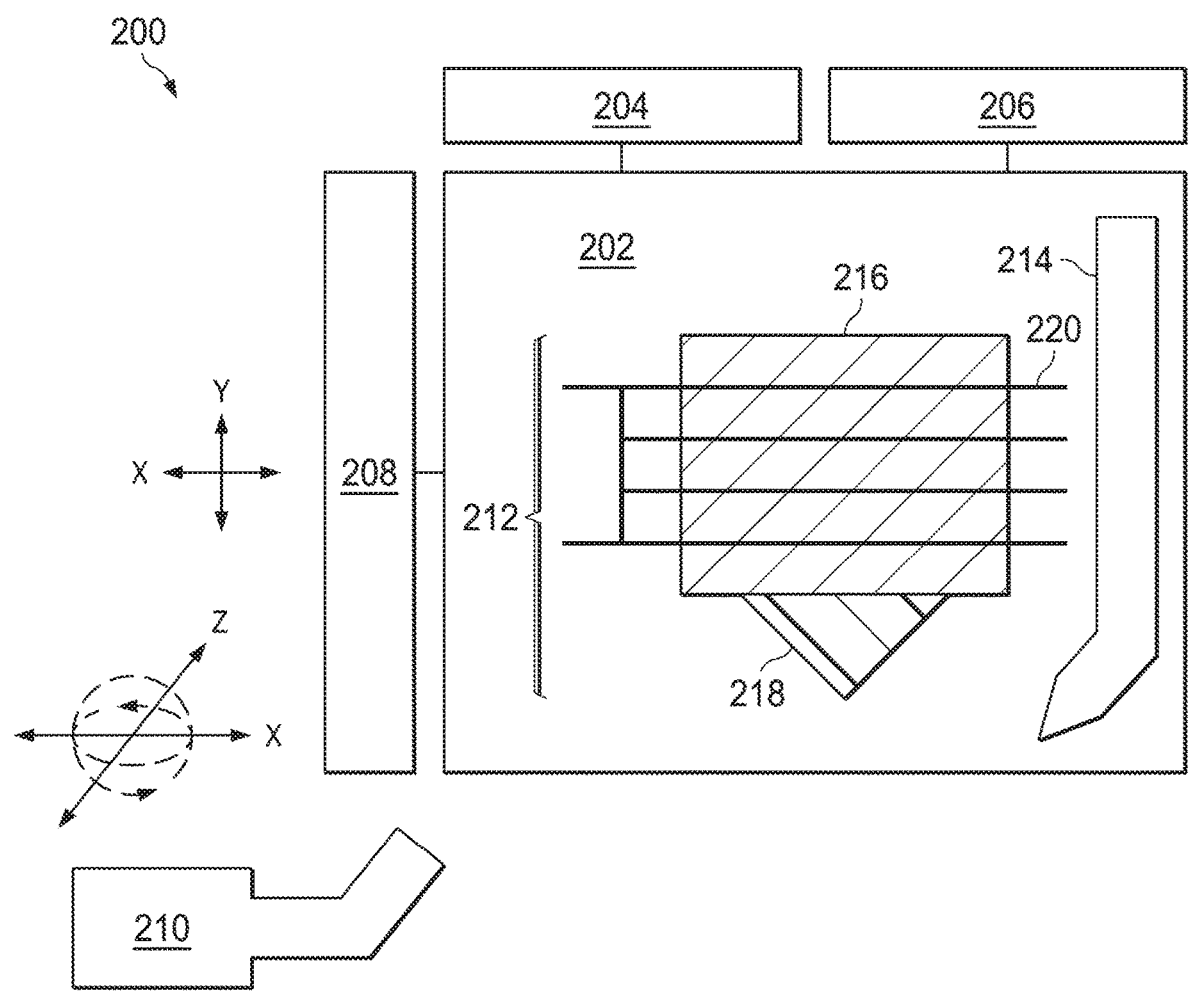
FIG. 4 is a block diagram of a hardfacing system for three dimensional printing (3D) hardfacing.

Turning now to FIG. 4, a hardfacing system 200 is illustrated. As shown, hardfacing system 200 may represent various hardfacing systems described herein. Hardfacing system 200 may include an application device 202, a first processor 204, which controls temperature, a second processor 206, which controls motion, a first positioner 208 coupled to application device 202, and a second positioner 210. Hardfacing system 200 may be a motion controlled system that may have multiple axes of motion including a first axis in an X direction, a second axis in a Y direction, a third axis in a Z direction, a fourth axis in a first 360 degree (360°) rotational direction, and a fifth axis in a second 360° rotational direction, where the fourth and fifth axis allow three dimensional spherical motion. Application device 202 includes a container for holding molten hardfacing and an applicator for allowing the molten hardfacing to flow out of application device 202 and onto a downhole tool. Application device 202 may also include a hardfacing heat source that heats the hardfacing. For example, application device 202 may include an extruder 212 having a crucible 216 coupled to a nozzle 218, an induction coil 220, which is a hardfacing heat source, surrounding crucible 216 to heat hardfacing in crucible 216, and a downhole tool heat source 214 to provide heat to a portion of a drill bit, such as a portion of respective roller cone assembly 122 of drill bit 120.

Crucible 216 may be a container made of a non-metallic material that may be capable of being heated to at least a crucible threshold temperature. The non-metallic material may be a ceramic material, or a graphite-based composite material. Crucible 216 may have a top having a top opening that may allow hardfacing, such as non-melted hardfacing, to be fed into crucible and a bottom having a bottom opening that may allow melted hardfacing to flow into nozzle 218 coupled to the bottom of crucible 216. "Melted hardfacing" is hardfacing in which the matrix material is melted, but the hard material particles are not melted, allowing the hardfacing to flow. The crucible threshold temperature may be between 3,500° F. and 4,000° F. Hardfacing matrix material melting points are typically between 1,000° F. and 4,000° F.

Nozzle 218 may be capable of being heated to at least the crucible threshold temperature of crucible 216. Nozzle 218 may be made of a non-metallic material, such as a non-metallic material suitable for crucible 216. It may be made of the same material as crucible 216. Nozzle 218 may have a funnel shape, a large opening at the large end of the funnel shape, and a small opening at the small end of the funnel shape. Crucible 216 may be coupled to the large end of nozzle 218. Extruder 212 may be substantially vertical within application device 202 with the small opening of nozzle 218 positioned in a downward position. The size of the small opening of nozzle 218 may allow particles in melted hardfacing to pass through the small opening of nozzle 218 and may also allow a rate of flow of the melted hardfacing flowing through nozzle 218 to be controlled. The size of the small opening of nozzle 218 may be based on the size of the hard material particles in the melted hardfacing. For example, the size of the small opening of nozzle 218 may be larger when larger sized hard material particles, such as tungsten carbide pellets, are included in the hardfacing and may be smaller when smaller hard material particles, such as tungsten carbide powders, are included in the hardfacing.

Induction coil 220 may be a helical wound coil, a solenoid coil, or another type of coil, which may be made from copper tube, and solid copper coil brazed together, or other types and configurations of material. Induction coil 220 may generate heat up to the crucible threshold temperature. During operation, induction coil 220 may receive power from a power supply (not shown) causing an alternating current (A/C) in induction coil 220, which may produce an electromagnetic field. The electromagnetic field may induce an A/C current that may pass through the hardfacing in crucible 216, which may heat the hardfacing. The power received from the power supply may be controlled such that induction coil 220 may provide and maintain the temperature in crucible 216 in a first temperate range. The matrix material component of the hardfacing in crucible 216 may melt in the first temperature range, but the hard material particle component may not. This allows the hardfacing to pool, and flow through nozzle 218. The first temperature range may be based on the melting point of matrix material of the particular type of hardfacing. The first temperature range may be 1,000° F. to 4,000° F. The upper limit of the first temperature range may be less than a hard material temperature threshold at which the hard material particles melt and/or experience thermal degradation and/or damage. For example, if the hard material particles are tungsten carbide particles, the hard material temperature threshold may be 3,500° F., or between 3,500° F. to 4,000° F.

Downhole tool heat source 214 may have a fixed position with respect to the components of application device 202 that contain and apply the melted hardfacing, such as crucible 216 or nozzle 218. Downhole tool heat source 214 may be a tungsten inert gas (TIG) torch or other heat source that produces an arc, and an oxygen acetylene torch or other heat source that produces a flame, or another heat source. Downhole tool heat source 214 may be substantially vertical within application device 202 to provide heat in a downward direction. Extruder 212 and downhole tool heat source 214 may be positioned relative to each other within application device 202 to allow downhole tool heat source 214 to precede extruder 212 during hardfacing application to prevent downhole tool heat source 214 from raising the temperature of the melted hardfacing. Extruder 212 and downhole tool heat source 214 may be positioned at a distance in a second distance range from each other. The second distance range may be between 1 cm to 1 m. During operation, downhole tool heat source 214 may maintain a temperature in a second temperature range. The second temperature range may be between 11,000° F. to 35,000° F. and may be based, in part, on a first duration of time needed to melt a portion of the surface of the drill bit, particularly a base metal in the portion of the surface, when downhole tool heat source 214 has a temperature in the second temperature range. The portion of the surface, particularly a base metal therein, typically melts a temperature below the second temperature range. For instance, the portion of the surface may melt at a temperature of 2,500° F. to 2,600° F. The second temperature range is higher than the temperature needed to melt the portion of the surface because downhole tool heat source 214 typically does not remain at a distance in a first distance range from the portion of the surface for a duration of time sufficient to raise the surface to the second temperature range; downhole tool heat source 214 typically remains at the distance in the first distance range from the portion of the surface for an amount of time sufficient to melt the portion of the surface and potentially for a short duration longer, for instance to ensure the melting has occurred. The first distance range may be between ¼ cm to 20 cm. Downhole tool heat source 214 may cause the portion of the surface of the drill bit to melt in less than one second and may even cause melting almost instantaneously, such as when a TIG torch is used as downhole tool heat source 214.

The second temperature range is typically higher than the melting point of the hard material particles in the hardfacing, or at a temperature which causes thermal degradation and/or damage to the hard material particles, such that it is advantageous to protect the hard material particles from reaching temperatures in the second temperature range. As a result, the first temperature range provided by induction coil 220 may be less than the second temperature range provided by downhole tool heat source 214.

First positioner 208 may include a motion controlled platform, a robotic arm, a Cartesian coordinate robotic arm, a cylindrical coordinate robotic arm, a spherical coordinate robot arm, an articulated robot arm, motors, arms, or another type of robot arm.

First positioner 208 may be able to move application device 202 back and forth along the first axis in the X direction, side to side along the second axis in the Y direction, and up and down along the third axis in the Z direction.

Second positioner 210 may include a motion controlled platform, a robotic arm, a Cartesian coordinate robotic arm, a cylindrical coordinate robotic arm, a spherical coordinate robot arm, an articulated robot arm, motors, arms, or another type of robot arm.

Second positioner 210 may be able to move a portion of a drill bit, such as a respective roller cone assembly 122 of drill bit 120, back and forth along the first axis in the X direction, side to side along the second axis in the Y direction, up and down along the third axis in the Z direction, rotate the portion of the drill bit along a fourth axis in a first 360° rotational direction, and rotate the portion of the drill bit along a fifth axis in a second 360° rotational direction.

Second positioner 210 may be able to couple to the portion of the drill bit whose surface is hardfaced, by second positioner 210 grasping and holding the portion of the drill bit, or mounting the portion of the drill bit to second positioner 210, or by another type of coupling technique. The portion of the drill bit may have a plurality of surfaces. Second positioner 210 may be able to move and rotate the portion of the drill bit to move a particular surface of the plurality of surfaces of the portion of the drill bit beneath extruder 212 such that extruder 212 may apply melted hardfacing on the particular surface.

First processor 204 may be a microprocessor, a microcontroller unit which may be a small computer or a single integrated circuit, a system on a chip (SoC) device, or another type of processor. First processor 204 may include one or more central processing units (CPUs), one or more processor cores, memory, an input/output (I/O) module, one or more I/O devices, and program memory. Memory and program memory may store one or more programs including a temperature control program, which may include instructions executable by first processor 204. Such instructions may include receiving data regarding the temperature of a heat source, comparing the data to a temperature range, and, if the temperature is not within the temperature range, sending a signal to the heat source to increase or decrease the temperature.

During operation, first processor 204 may control the heat supplied by the hardfacing heat source. For example first processor 204 may execute the temperature control program to control and maintain power supplied by a power supply that may cause an A/C current in induction coil 220, previously described. By first processor 204 controlling and maintaining the power and A/C current in induction coil 220, first processor 204 may control and maintain the first temperature range provided by induction coil 220, which may cause the matrix material component of the hardfacing in crucible 216 to melt. First processor 204 may also control the second temperature range provided by downhole tool heat source 214, which may melt a particular portion of the surface of the drill bit beneath downhole tool heat source 214.

Second processor 206 may be a microprocessor, a microcontroller unit which may be a small computer or a single integrated circuit, a system on a chip (SoC) device, or another type of processor. Second processor 206 may include one or more central processing units (CPUs), one or more processor cores, memory, an input/output (I/O) module, one or more I/O devices, and program memory. Memory and program memory may store one or more programs including a motion control program, which may include instructions executable by second processor 204. Such instructions may include receiving data regarding the position of the application device, position of the downhole tool, the relative positions of the application device and the downhole tool, the position of the first positioner, the positon of the second positioner, or any combinations thereof, comparing the data to one or more pre-selected positions, and, if the data and the pre-selected position do not match, optionally within a specified tolerance, sending a signal to the second processor to move the application device, the downhole tool, the first positioner, the second positions, or any combinations thereof.

Second processor 206 and first processor 204 may be the same processor.

During operation, second processor 206 may execute the motion control program to control the movement of first positioner 208 back and forth along the first axis in the X direction, side to side along the second axis in the second direction, and up and down along the third axis in the Z direction that may position downhole tool heat source 214 and the portion of application device 202 that applies melted hardfacing, such as nozzle 218, over a portion of the drill bit that may allow downhole tool heat source 214 to heat a particular surface of a plurality of surfaces of the portion of the drill bit and application device 202 to subsequently apply melted hardfacing on the particular surface of the plurality of surfaces of the portion of the drill bit. Second processor 206 may also control the movement of second positioner 210 back and forth along the first axis in the X direction, side to side along the second axis in the Y direction, up and down along the third axis in the Z direction, in a first 360° rotational direction along the fourth axis, and in a second 360° rotational direction along the fifth axis which may allow second positioner 210 to position the particular surface of the plurality of surfaces of the portion of the drill bit beneath heat source 214 and nozzle 218 to allow heat source 214 to melt the base metal of the particular surface and allow nozzle 218 to subsequently apply melted hardfacing on the particular surface. When second processor 206 is not controlling the movement of second positioner 210, second processor 206 may also position downhole heat source 214 and nozzle 218 over the particular surface of the plurality of surfaces of the portion of the drill bit to allow downhole tool heat source 214 to melt the base metal of the particular surface and allow nozzle 218 to subsequently apply melted hardfacing on the particular surface. Second processor 206 may coordinate the control of the movement of first positioner 208 and the movement of second positioner 210 to apply melted hardfacing on the particular surface and allow the melted base metal of the particular surface to bond with the applied melted hardfacing. Second processor 206 may control the movement of second positioner 210 to position other surfaces of the portion of the drill beneath nozzle 218 and heat source 214 for application of melted hardfacing on the melted base metal of the other surfaces as previously described. The operation of hardfacing system 200 is described in further detail below.

Turning now to FIG. 5, hardfacing system 200, while applying hardfacing on selected surfaces of a drill bit is illustrated. FIG. 5 illustrates hardfacing system 200 used on exemplary roller cone assembly 122. Hardfacing system 200 may hardface other portions of drill bits and downhole tools.

Second processor 206 controls first positioner 208 to position nozzle 218 and downhole tool heat source 214 over roller cone assembly 122. Second processor 206 may also control second positioner 210 to position the particular surface of the plurality of surfaces of roller cone assembly 122 beneath nozzle 218 and downhole tool heat source 214. When second processor 206 is not controlling second positioner 210, second processor 206 may also control first positioner 208 to position nozzle 218 and downhole tool heat source 214 over a particular surface of a plurality of surfaces of roller cone assembly 122 when movement of second positioner 210. Second processor 206 may include sensors (not shown) that may allow second processor 206 to control the positions of nozzle 218 and downhole tool heat source 214 and the position of the particular surface roller cone assembly 122 relative to each other.

Similar to a 3D printer, hardfacing 302 may be fed into crucible 216 through the top of crucible 216 in a downward direction 304. Hardfacing 302 may be in the form of a hardfacing rod, a spool of hardfacing, and a hardfacing powder, or another form. First processor 204 may control induction coil 220 to maintain its temperature in the first temperature range, which may cause the matrix material in hardfacing 302 fed into crucible 216 to melt and pool while hard material particles of hardfacing 302 may remain solid. The matrix material, once melted in crucible 216, may be generally maintained at a temperature in the first temperature range using induction coil 220.

The first temperature generated by induction coil 220 may be at least as high as the melting point of the matrix material in the hardfacing, but less than the crucible threshold temperature. Melted hardfacing 302 in crucible 216 may flow into nozzle 218 in downward direction 304 and be extruded out of the small opening of nozzle 218.

During the extrusion of melted hardfacing 302, depicted as extruded hardfacing 302, second processor 206 may utilize the sensors of second processor 206 to control the movement of first positioner 208 so that nozzle 218 moves up and down along the Z-axis in the Z direction to follow the contour of the particular surface of roller cone assembly 122, which may allow the extruded hardfacing 302 to be applied on the particular surface shown as applied hardfacing 126. When the extruded hardfacing 504 is applied on a substantially flat surface of roller cone assembly 122, the up and down movement of nozzle 218 may be minimal. When the extruded hardfacing 302 is applied on a substantially concave or convex surface of roller cone assembly 122, the up and down movement of nozzle 218 may be more pronounced.

Second processor 206 may utilize the sensors of second processor 206 and may also control the movement of second positioner 210 so that the particular surface of roller cone assembly 122 may be in a horizontal position and the particular surface may oscillate back and forth along the X-axis in the X direction, side to side along the Y-axis in the Y direction, up and down along the third axis in the Z direction, rotate along the fourth axis within the first 360° of rotation, and rotate along the fifth axis within the second 360° of rotation such that the particular surface may be beneath nozzle 218 and downhole tool heat source 214 while nozzle 218 is extruding extruded hardfacing 302 and applying applied hardfacing on the particular surface. Having the particular surface of roller cone assembly 122 in a horizontal position may simplify the hardfacing and may prevent applied melted hardfacing from flowing off the particular surface. Oscillating the particular surface of roller cone assembly 122 back and forth, side to side, up and down, and rotating roller cone assembly 122 within the first and second 360° of rotation during the complete application process 300 may allow extruded hardfacing 302 to be applied in a layer of applied hardfacing 126 over substantially the entire particular surface.

While hardfacing is applied on the particular surface, heat source 214 may be at second temperature range and may apply heat to the particular surface, thereby causing a portion of the particular surface, particularly a base metal therein, at a distance within the distance range from downhole tool heat source 214 to melt. The portion of the particular surface at the distance within the distance range from downhole tool heat source 214 may melt in less than the first duration of time, as previously described. Melting the particular surface using heat source 214 may eliminate the need to pre-heat roller cone assembly 122 prior to applying hardfacing.

Figure 6A:
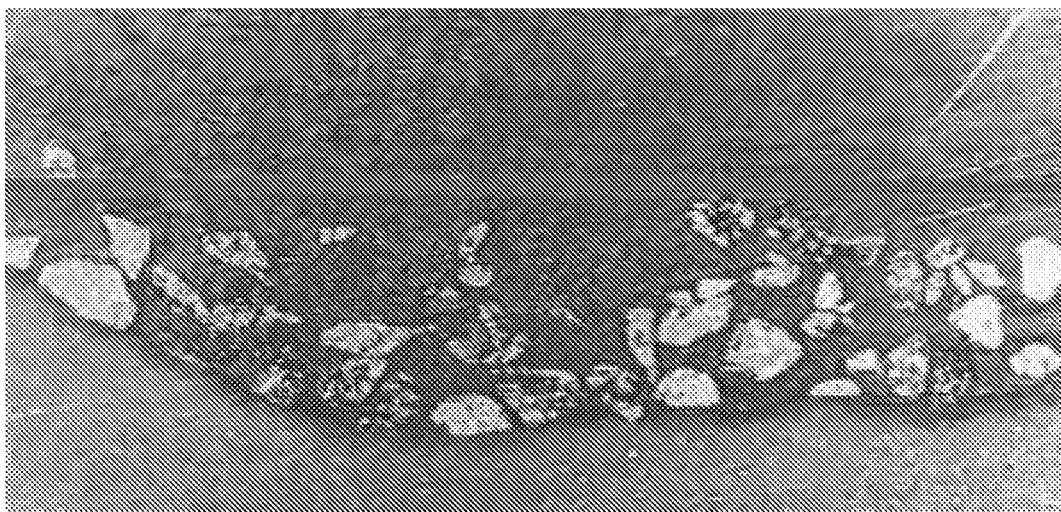
FIGS. 6A and 6B are photographs of damaged tungsten carbide particles in hardfacing following exposure to excessive heat.
Figure 6B:
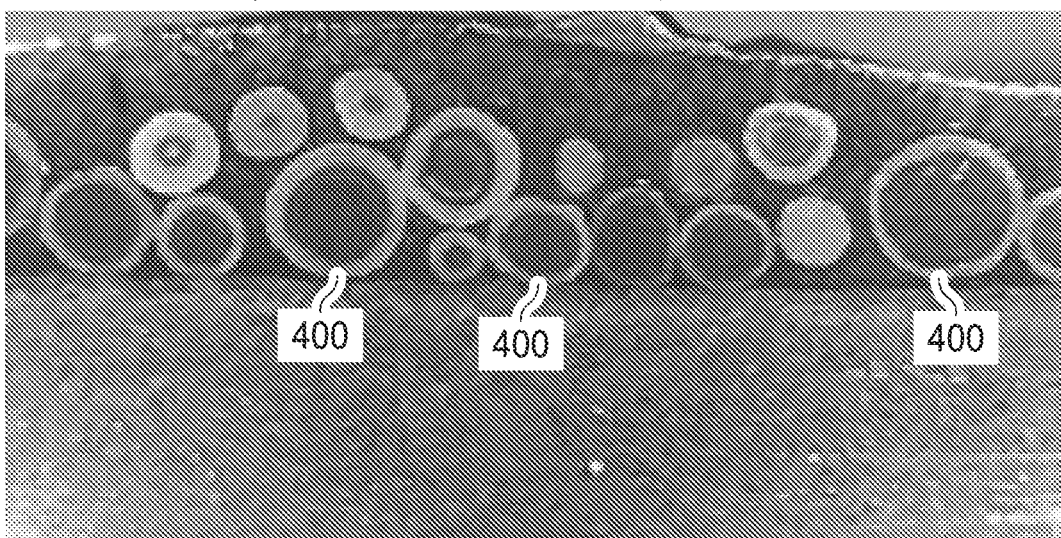

Downhole tool heat source 214 may be positioned and controlled such that hard material particles in the hardfacing do not experience thermal damage and/or degradation due to exposure to high temperatures provided by downhole tool heat source 214. FIGS. 6A and 6B shows examples of such thermal damage and/or degradation of tungsten carbide particles in hardfacing. FIG. 6A shows the dissolution and settling damage of tungsten carbide particles in hardfacing that may result when the hardfacing is exposed to a TIG torch. The temperature of the TIG torch may be as high as 11,000° F. or even 35,000° F., which is above the melting point of the tungsten carbide and many other hard materials that may be used in the hardfacing. FIG. 6B shows thermal damage and/or degradation of tungsten carbide particles that may result when the hardfacing is exposed to an oxygen-acetylene torch. The excessive heat may cause a halo effect 400 in the tungsten carbide particles.

The placement of nozzle 218 and downhole tool heat source 214 of hardfacing system 200 of FIGS. 4 and 5 relative to each other may prevent or minimize these types of damage and/or degradation of hard material particles, such as tungsten carbide particles. First processor 204 also prevents and minimizes damage and/or degradation of hard material particles, such as tungsten carbide particles, by controlling and maintaining the temperature of induction coil 220 to keep the hard material particles from experiencing a temperature above the hard material temperature threshold.

Figure 7:
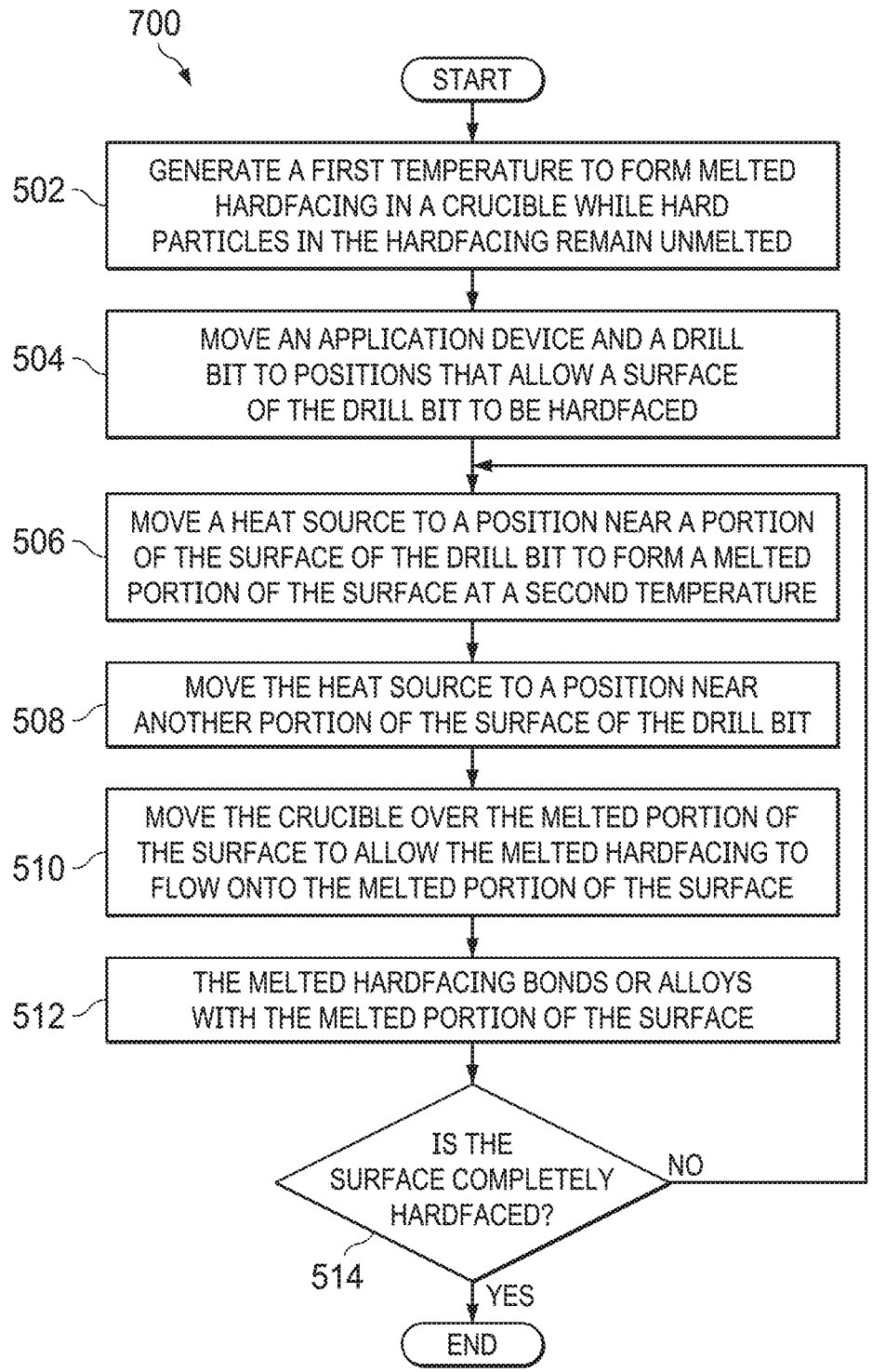
FIG. 7 is a flow chart of a method for 3D printing hardfacing.

FIG. 7 is a flow chart of a method 500 for 3D printing hardfacing, as described herein. Method 500 may be performed using hardfacing system 200 (such as depicted in FIGS. 4 and 5) and, in particular, by application device 202, first processor 204, second processor 206, first positioner 208, and second positioner 210. Other hardfacing systems may also be used. Certain operations described in method 500 may be optional or may be rearranged in variant methods.

In step 502, a first processor of a hardfacing system causes a hardfacing heat source, such as an induction coil surrounding a crucible of an extruder of an application device, to generate a first temperature in a container holding hardfacing, such as the crucible. The first temperature is in a first temperature range at which a matrix material component of the hardfacing melts to form melted hardfacing, while hard material particles in the hardfacing remain unmelted.

In step 504, which may occur prior to, after, or simultaneously with step 502, a second processor of the hardfacing system controls movement of a first positioner and a second positioner of the hardfacing system to place the hardfacing system in a position that allows a surface of the drill bit to be hardfaced. The first positioner moves the application device along a first set of one or more axes of motion and the second positioner moves a drill bit along a second set of one or more axes of motion. The surface of the drill bit to be hardfaced has a plurality of portions.

In step 506, a downhole tool heat source is positioned at a first distance from one portion of the surface of the drill bit for a set period of time. A first processor controls the downhole tool heat source positioned at the first distance from the portion of a surface of the drill bit such that the downhole tool heat source is at a second temperature in a second temperature range. The portion of the surface, or a component thereof such as a base metal, melts within a set period of time when positioned at the first distance in a first distance range from the downhole tool heat source at the second temperature to form a melted portion of the surface.

In step 508, the downhole tool heat source is moved from its position at the first distance from the melted portion of the surface of the drill bit to a position at the first distance from another portion of the surface of the drill bit.

In step 510, which may be simultaneous with step 508, the first and/or second positioner(s) position(s) the crucible over the melted portion of the surface of the drill bit and melted hardfacing flows through the applications device, such as through a nozzle coupled to the crucible, and onto the melted portion of the surface of the drill bit, which has a temperature less than a hard material threshold temperature of hard material particles in the hardfacing.

In step 512, the melted hardfacing bonds or alloys with the melted portion of the surface, such as melted base metal.

In step 514, if the surface is not completely hardfaced, then the process returns to step 506. If the surface is completely hardfaced, then the process ends.

As disclosed herein, systems and methods for 3D printing hardfacing on downhole tools using a hardfacing system. The present disclosure also provides generating a first temperature in an application device of the hardfacing system to cause hardfacing in the application device to melt and flow through the application device without melting particles in the hardfacing. The present disclosure further provides a downhole tool heat source positioned at a distance from a first surface of a downhole tool such that the heat source is at a second temperature that melts the first surface. The present disclosure also provides applying the melted hardfacing from the application device such that the melted first surface and the melted hardfacing bond.

In an embodiment A, the present disclosure provides a hardfacing system. The hardfacing system includes an application device including a hardfacing heat source and a downhole tool heat source. The hardfacing system also includes a first processor that controls the hardfacing heat source to maintain a first temperature to cause a matrix material in hardfacing in the application device to melt without melting hard material particles in the hardfacing. The hardfacing system further includes a second processor that controls movement of the application device to place the downhole tool heat source at a first distance from a portion of the surface of the downhole tool for a time sufficient to form a melted portion of the surface.

In an embodiment B, the present disclosure provides a hardfacing system. The hardfacing system includes an application device including a hardfacing heat source and a downhole tool heat source. The hardfacing system also includes a first processor that controls the hardfacing heat source to maintain a first temperature to cause a matrix material in hardfacing in the application device to melt without melting hard material particles in the hardfacing, to form melted hardfacing that flows through the application device and controls the downhole tool heat source to maintain a second temperature to cause the downhole tool heat source to melt at least a component of a portion of a surface of a downhole tool positioned at a first distance from the downhole tool heat source to form a melted portion. The hardfacing system further includes a second processor that controls movement of the application device to place the downhole tool heat source at the first distance from a portion of the surface of the downhole tool for a time sufficient to form a melted portion of the surface, move the downhole tool heat source away from the melted portion of the surface, and move the application device so that the melted hardfacing flows onto the melted portion of the surface of the downhole tool and the melted hardfacing bonds or alloys with the melted portion of the surface.

In an embodiment C, the present disclosure provides a hardfacing system. The hardfacing system includes an application device including a hardfacing heat source and a downhole tool heat source. The hardfacing system also includes a first processor that controls the hardfacing heat source to maintain a first temperature to cause a matrix material in hardfacing in the application device to melt without melting hard material particles in the hardfacing, to form melted hardfacing that flows through the application device and controls the downhole tool heat source to maintain a second temperature to cause the downhole tool heat source to melt at least a component of a portion of a surface of a downhole tool positioned at a first distance from the downhole tool heat source to form a melted portion. The hardfacing system further includes a second processor that controls movement of the application device to place the downhole tool heat source at the first distance from a portion of the surface of the downhole tool for a time sufficient to form a melted portion of the surface, move the downhole tool heat source away from the melted portion of the surface, and move the application device so that the melted hardfacing flows onto the melted portion of the surface of the downhole tool and the melted hardfacing bonds or alloys with the melted portion of the surface.

In an embodiment D, the present disclosure provides a method of hardfacing a downhole tool. The method includes melting, in an application device, a matrix material in hardfacing at a first temperature without melting hard material particles in the hardfacing to form melted hardfacing, positioning a downhole tool heat source of the application device at a second temperature at a first distance from a portion of a surface of a downhole tool to form a melted portion of the surface, moving the downhole tool heat source away from the melted portion of the surface, and positioning the application device over the melted portion of the surface so that the melted hardfacing flows out of the application device and onto the melted portion of the surface to bond or alloy with the melted portion of the surface.

In further embodiments, the system of embodiment A may be used to implement the method of embodiment D, the system of embodiment B may be used to implement the method of embodiment D, the system of embodiment C may be used to implement the method of embodiment D, the method of embodiment D may be implemented using the system of embodiment A, the method of embodiment D may be implemented using the system of embodiment B, the method of embodiment D may be implemented using the system of embodiment C, in addition, the system or method may have any one or combinations of the following additional features, unless such features are clearly mutually exclusive: i) the first and second processor may be the same processor; ii) the surface of the downhole tool may include a plurality of portions and the second processor may further control movement of the application device to allow melted hardfacing to bond or alloy with at least two of the plurality of portions; iii) the surface of the downhole tool may include a plurality of portions and the second processor may further control movement of the application device to allow melted hardfacing to bond or alloy with substantially all of the plurality of portions; iv) the application device may further include an extruder having a crucible coupled to a nozzle, in which the hardfacing heat source is an induction coil surrounding the crucible, the hardfacing is in the crucible and the melted hardfacing flows through the nozzle, and the extruder and the downhole tool heat source are positioned relative to each other within the application device such that the downhole tool heat source is positioned at the first distance from the portion of the surface before the crucible is positioned over that portion as the second processor positions the application device; v) the extruder and the downhole tool heat source may have fixed positions relative to one another within the application device; vi) the first temperature may be within a first temperature range; vii) the second temperature may be within a second temperature range, and wherein the first temperature range may be less than the second temperature range; viii) the first temperature range may be between 1,000° F. and 4,000° F. and the second temperature range may be between 11,000° F. and 35,000° F.; ix) the first distance may be within a first distance range; x) the first distance range may be between ¼ cm and 20 cm; xi) the hard material particles may have a melting point and the first temperature range may be less than the melting point of the hard material particles in the hardfacing; xii) the second processor may control the movement of the application device in an X-axis of motion, a Y-axis of motion, and a Z-axis of motion, in which the X-axis of motion, Y-axis of motion, and Z-axis of motion are defined by 90 degree angles with respect to one another, and the second processor may further control movement of the downhole tool in the X-axis of motion, the Y-axis of motion, the Z-axis of motion, on a fourth axis with a first 360 degree rotational direction, and on a fifth axis with a second 360 degree rotational direction; xiii) the second processor may control the movement of the application device at least on the X-axis and the Z-axis; xiv) the second processor may further control movement of a first positioner of the hardfacing system to control the movement of the application device; xv) the second processor may further control movement of a second positioner of the hardfacing system to control the movement of the downhole tool at least on the X-axis, the Y-axis, the fourth axis, and the fifth axis; xvi) the second processor may further control movement of a second positioner of the hardfacing system to further control movement of the downhole tool; xvii) the first positioner may include a motion controlled platform, a robotic arm, a Cartesian coordinate robotic arm, a cylindrical coordinate robotic arm, a spherical coordinate robot arm, and/or an articulated robot arm; xviii) the second positioner may include a motion controlled platform, a robotic arm, a Cartesian coordinate robotic arm, a cylindrical coordinate robotic arm, a spherical coordinate robot arm, and/or an articulated robot arm; xix) the hardfacing may include a hardfacing rod, a hardfacing spool, and a hardfacing powder; xx) the downhole tool heat source may include a tungsten inert gas torch or an oxygen acetylene torch; xxi) the method may include bonding or alloying melted hardfacing with at least two of a plurality of portions of the surface; xxii) the method may include bonding or alloying melted hardfacing with substantially all of a plurality of portions of the surface; xxiii) at least one positioning or moving step may include moving the downhole tool at least on an X-axis of motion, a Y-axis of motion, a Z-axis of motion, a fourth axis of motion, and a fifth axis of motion; xxiv) positioning the application device over the melted portion may include moving the application device at least on the X-axis of motion, the Y-axis of motion, and a Z-axis of motion; xxv) the X-axis of motion, the Y-axis of motion, and the Z-axis of motion may be by 90 degree angles with respect to one another, and the fourth axis of motion may be defined by a first 360 degree rotational direction, and the fifth axis of motion may be defined by a second 360 degree rotational direction; xxvi) the downhole tool may be a rotary drill bit, a roller cone drill bit, a fixed-cutter drill bit, a reamer, a core bit, an under reamer, a near bit reamer, a hole opener, a stabilizer, a centralizer, or a shock absorber assembly; xxvii) the hardfacing may include a hardfacing rod, a hardfacing spool, or a hardfacing powder; xxviii) the hard material particles in the hardfacing may include a powder or pellets; xxix) the matrix material may include at least one material selected from the group consisting of a metal, a metal alloy, a ceramic alloy, and a cermet; xxx) the matrix material may include at least one material selected from the group consisting of an iron alloy, an iron, manganese, and silicon alloy, copper, a copper alloy, nickel, a nickel alloy, cobalt, and a cobalt alloy; xxxi) the hard material particles may include at least one of a metal boride, a metal carbide, a metal nitride, and a metal silicide; xxxii) the hard material particles may include at least one material selected from the group consisting of tungsten, tungsten boride tungsten carbide, tungsten nitride, tungsten oxide, tungsten silicide, copper, copper boride, copper carbide, copper oxide, copper nitride, copper silicide, niobium, niobium boride niobium carbide, niobium nitride, niobium oxide, niobium silicide, vanadium, vanadium boride vanadium carbide, vanadium nitride, vanadium oxide, vanadium silicide, molybdenum, molybdenum boride molybdenum carbide, molybdenum oxide, molybdenum nitride, molybdenum silicide, titanium, titanium boride titanium carbide, titanium oxide, titanium nitride, titanium silicide, tantalum, tantalum boride tantalum carbide, tantalum oxide, tantalum nitride, tantalum silicide, zirconium, zirconium boride, zirconium carbide, zirconium oxide, zirconium nitride, zirconium silicide, chromium, chromium boride chromium carbide, chromium oxide, chromium nitride, chromium silicide, yttrium, yttrium boride yttrium carbide, yttrium oxide, yttrium nitride, yttrium silicide, boron, boron carbide, boron oxide, boron nitride, boron silicide, silicon, silicon boride, silicon carbide, silicon oxide, and silicon nitride; xxxiii) the method may include not heating the downhole tool other than with the downhole tool heat source.

The present disclosure further includes downhole tools, such as drill bits, hardfaced using any of the above systems or methods as well as methods of forming a wellbore using such downhole tools.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A hardfacing system comprising:
   an application device including:
      a hardfacing heat source; and
      a downhole tool heat source;
   a first processor that:
      controls the hardfacing heat source to maintain a first temperature to cause a matrix material in hardfacing in the application device to melt without melting hard material particles in the hardfacing; and
   a second processor that controls movement of the application device to:
      place the downhole tool heat source at a first distance from a portion of the surface of the downhole tool for a time sufficient to form a melted portion of the surface.

2. The hardfacing system of claim 1, wherein the surface of the downhole tool comprises a plurality of portions and the second processor further controls movement of the application device to allow melted hardfacing to bond or alloy with at least two of the plurality of portions.

3. The hardfacing system of claim 1, wherein the surface of the downhole tool comprises a plurality of portions and the second processor further controls movement of the application device to allow melted hardfacing to bond or alloy with substantially all of the plurality of portions.

4. The hardfacing system of claim 1, wherein the application device further comprises:
   an extruder having a crucible coupled to a nozzle; wherein the hardfacing heat source is an induction coil surrounding the crucible, wherein the hardfacing is in the crucible and the melted hardfacing flows through the nozzle, and wherein the extruder and the downhole tool heat source are positioned relative to each other within the application device such that the downhole tool heat source is positioned at the first distance from the portion of the surface before the crucible is positioned over that portion as the second processor positions the application device.

5. The hardfacing system of claim 4, wherein the extruder and the downhole tool heat source have fixed positions relative to one another within the application device.

6. The hardfacing system of claim 1, wherein the first temperature is within a first temperature range.

7. The hardfacing system of claim 6, wherein the second temperature is within a second temperature range, and wherein the first temperature range is less than the second temperature range.

8. The hardfacing system of claim 7, wherein the first temperature range is between 1,000° F. and 4,000° F. and the second temperature range is between 11,000° F. and 35,000° F.

9. The hardfacing system of claim 8, wherein the first distance is within a first distance range.

10. The hardfacing system of claim 9, wherein the first distance range is between ¼ cm and 20 cm.

11. The hardfacing system of claim 6, wherein the hard material particles have a melting point and the first temperature range is less than the melting point of the hard material particles in the hardfacing.

12. The hardfacing system of claim 1, wherein the second processor controls the movement of the application device in an X-axis of motion, a Y-axis of motion, and a Z-axis of motion, wherein the X-axis of motion, Y-axis of motion, and Z-axis of motion are defined by 90 degree angles with respect to one another, and wherein the second processor further controls movement of the downhole tool in the X-axis of motion, the Y-axis of motion, the Z-axis of motion, on a fourth axis with a first 360 degree rotational direction, and on a fifth axis with a second 360 degree rotational direction.

13. The hardfacing system of claim 12, wherein the second processor controls the movement of the application device at least on the X-axis and the Z-axis.

14. The hardfacing system of claim 12, wherein the second processor further controls movement of a second positioner of the hardfacing system to control the movement of the downhole tool at least on the X-axis, the Y-axis, the fourth axis, and the fifth axis.

15. The hardfacing system of claim 14, wherein the second positioner comprises a motion controlled platform, a robotic arm, a Cartesian coordinate robotic arm, a cylindrical coordinate robotic arm, a spherical coordinate robot arm, and/or an articulated robot arm.

16. The hardfacing system of claim 1, wherein the second processor further controls movement of a first positioner of the hardfacing system to control the movement of the application device.

17. The hardfacing system of claim 16, wherein the first positioner comprises a motion controlled platform, a robotic arm, a Cartesian coordinate robotic arm, a cylindrical coordinate robotic arm, a spherical coordinate robot arm, and/or an articulated robot arm.

18. The hardfacing system of claim 1, wherein the second processor further controls movement of a second positioner of the hardfacing system to further control movement of the downhole tool.

19. The hardfacing system of claim 1, wherein the hardfacing comprises a hardfacing rod, a hardfacing spool, and a hardfacing powder.

20. The hardfacing system of claim 1, wherein the downhole tool heat source comprises a tungsten inert gas torch or an oxygen acetylene torch.

* * * * *